Oct. 6, 1964    H. C. WALLAR    3,151,968
APPARATUS AND METHOD FOR FORMING HOLLOW GLASS ARTICLES
Filed May 22, 1961    3 Sheets-Sheet 1
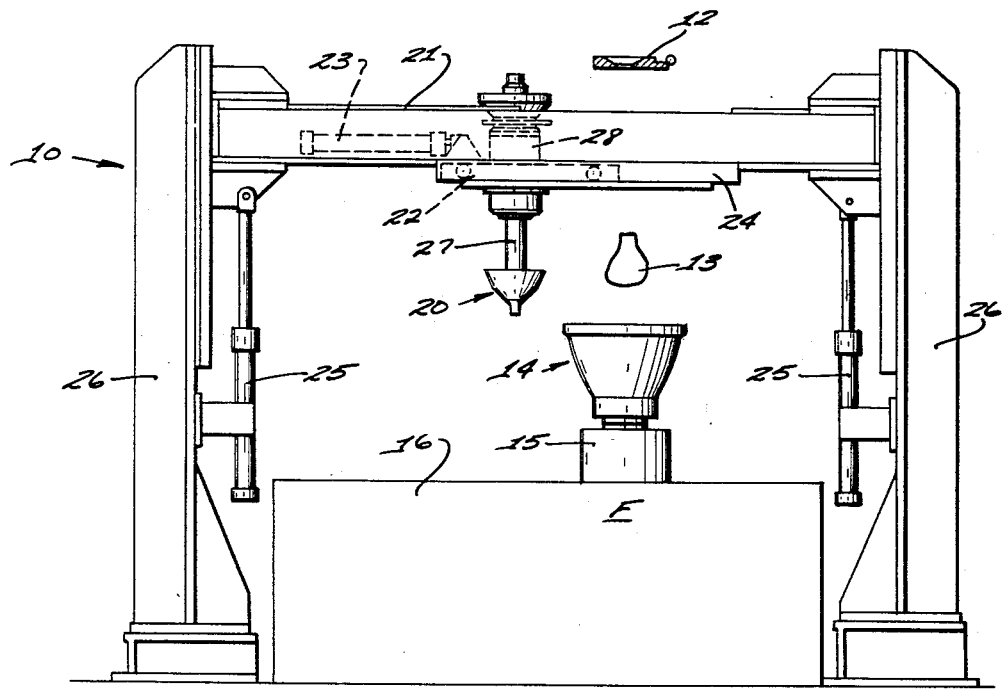
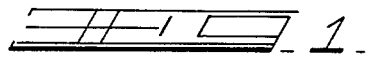
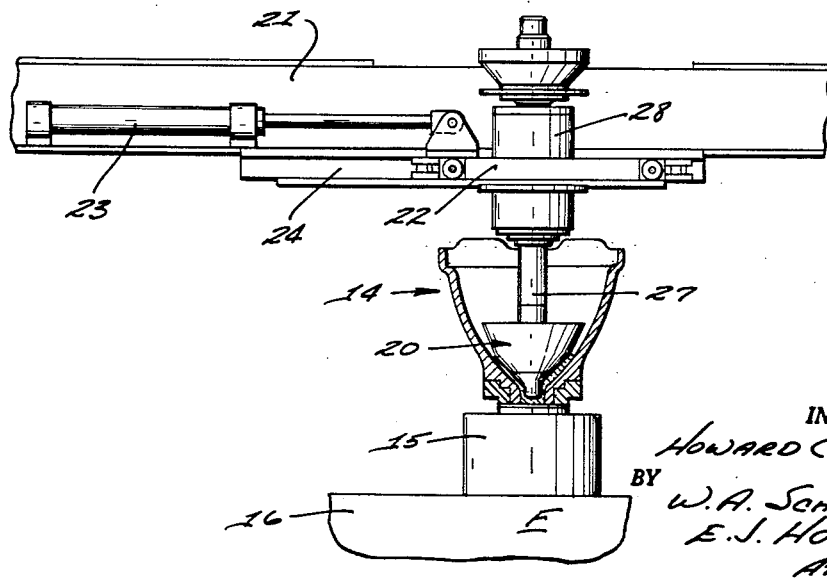
INVENTOR.
HOWARD C. WALLAR
BY W. A. SCHAICH &
E. J. HOLLER
ATTORNEYS Oct. 6, 1964  H. C. WALLAR  3,151,968
APPARATUS AND METHOD FOR FORMING HOLLOW GLASS ARTICLES
Filed May 22, 1961  3 Sheets-Sheet 2
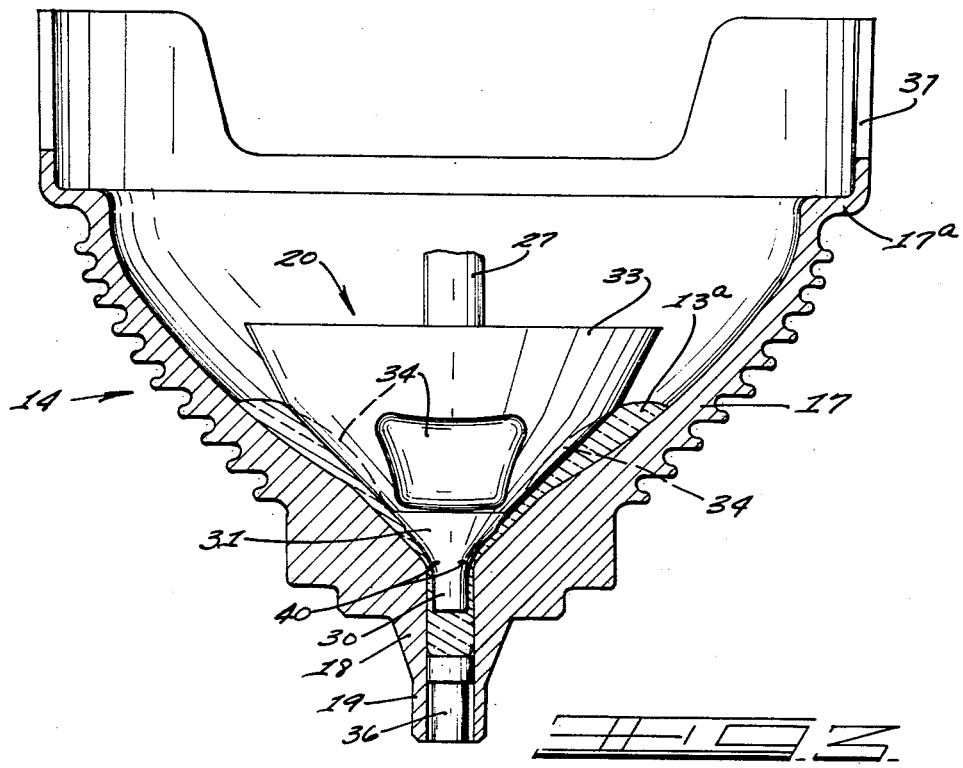
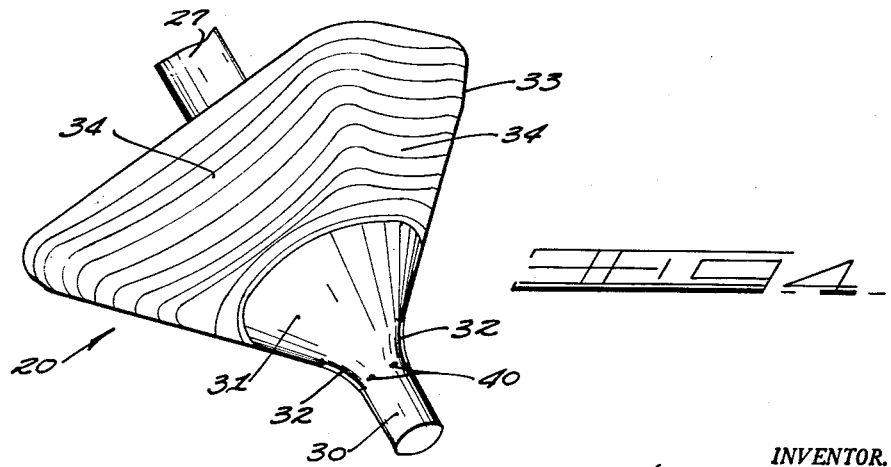
INVENTOR.
HOWARD C. WALLAR
BY
W. A. SCHAICH &
E. J. HOLLER
ATTORNEYS

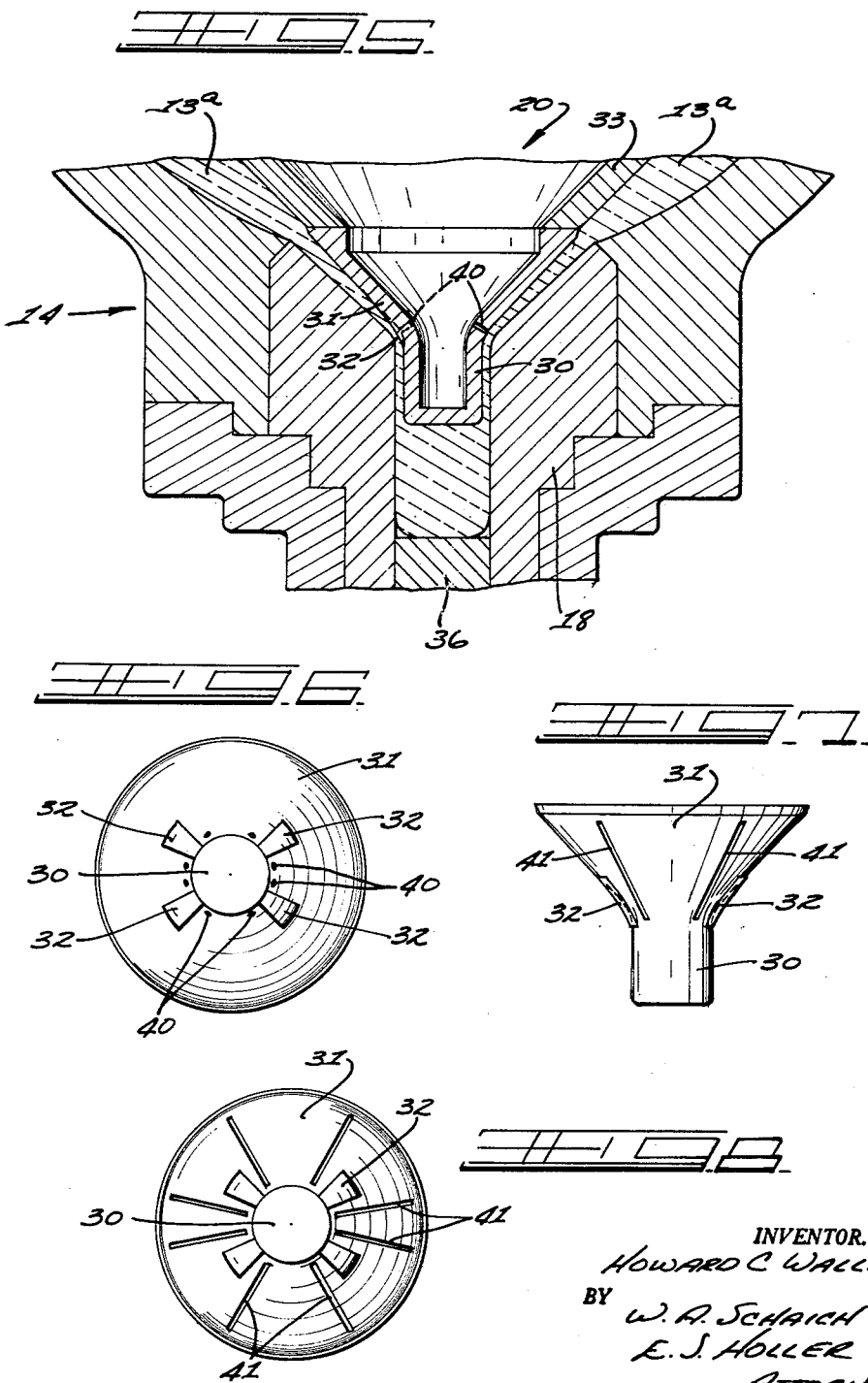

United States Patent Office 3,151,968
Patented Oct. 6, 1964

3,151,968
APPARATUS AND METHOD FOR FORMING HOLLOW GLASS ARTICLES
Howard C. Wallar, Columbus, Ohio, assignor, by mesne assignments, to Owens-Illinois Glass Company, Toledo, Ohio, a corporation of Ohio
Filed May 22, 1961, Ser. No. 111,723
6 Claims. (Cl. 65—71)

This invention relates to the manufacture of hollow articles by combinedly pressing and centrifugal molding action, and more specifically, to apparatus for and method of molding generally conically-shaped hollow glass articles by a combined press-and-spin process.

More particularly, the present invention pertains to the manufacture of hollow glass funnels or body members of cathode-ray picture tube envelopes for television reception, and particularly tube envelopes having rectangularly-shaped viewing screens. The invention is related to forming such funnel members preferably with a non-circular internal apex configuration and a substantially rectangular open-end by pressing a portion of a molten glass charge within a rotatable centrifugal casting mold with a cooperating pressing plunger followed by centrifugal formation of the remainder of the article.

Recently-developed cathode-ray tubes such as television picture tubes for recreating monochromatic and polychromatic images incorporate funnel members having widely flaring sidewalls and rectangular viewing screens. Such envelopes permit reducing the over-all tube length commensurate with making the tube envelope having lighter weight. In order to fabricate wide-angle "square-look" tube envelopes providing both larger and more definitely rectangular viewing screens, it has become preferred to form the internal apex surface of the funnel member with a non-circular configuration which cannot be formed by conventional centrifugal casting processes previously employed in making such articles from molten glass.

Cathode-ray picture tube envelopes incorporating the aforementioned features are disclosed in the copending patent application of James C. Coleman and Ray W. Mayhew, Serial No. 841,730, filed September 23, 1959, now Patent No. 3,005,122, entitled "Cathode Ray Tube Envelope and Method of Forming Body Portion Thereof," and assigned to the same assignee as the present application. Further, basic apparatus for forming such funnel members is illustrated and described in the copending patent application of John R. Prendergast and William A. Stutske, Serial No. 58,562, filed September 26, 1960, entitled "Method and Apparatus for Making a Glass Article," also assigned to the same assignee as this application.

The present invention more fully disclosed and claimed hereinbelow proposes an improved apparatus and method of making the body portion of a cathode-ray picture tube envelope as set forth in the earlier-filed copending applications, Serial No. 841,730 and Serial No. 19,883, the latter being a divisional application of the former. Both applications relate to tube envelope structure and methods of forming primary component parts thereof which provide more efficient use of beam deflection power in recreating transmitted images by forming the inner surface of the funnel vortex area with a non-circular outline. Such contour facilitates the immergence of the rectangular raster as it is developed from the electron beam source in scanning the full rectangular viewing screen of the tube.

The present invention is directed toward overcoming difficulties inherent in press-forming the funnel vortex area into either circular or non-circular configuration concomitant with centrifugal casting of major sidewalls of the funnel wherein such funnels have greater variation in radial symmetry at their large open ends due to non-circular more definitely rectangular peripheral outline and greater variance of radial dimensions of major sizes of tube funnels. During the press-forming phase of fabricating a hollow article by combined pressing and centrifugal spinning, it is frequently possible for pockets of air to become trapped between upper surfaces of the molten glass and the plunger pressing surfaces particularly adjacent the lower region of the frusto-conical surfaces. When this occurs the glass cannot be properly press-formed into relatively thin sidewalls at the yoke area with precise contours and dimensions free from imperfections. The present invention is specifically directed to overcoming such difficulties.

Briefly stated, the apparatus of the present invention includes a press plunger having both cylindrical and frusto-conical forming surfaces at its lower extremity which co-operate with a bottom apex region of an open-topped generally frusto-conical mold rotatable about a vertical axis. The present apparatus is of particular utility for use with the apparatus and method disclosed in application Serial No. 58,562. In such apparatus a vertically-movable horizontal beam or bridge is supported by a pair of spaced columns for vertical displacement relative to the path of a plurality of individually rotatable molds, such beam or bridge carrying the subject pressing plunger in downwardly-projecting depending relation for axial insertion into each mold when disposed therebelow. The pressing plunger is able to effect pressing action on the molten glass charge introduced into the mold immediately subsequent to its introduction and is retractable from major contact with the glass charge prior to centrifugal formation of major sidewalls of the glass article immediately following the pressing operation. The pressing plunger is mounted on a carriage displaceable both horizontally on the beam and vertically with the beam during its vertical displacement. The pressing plunger is moved by the carriage from axial alignment with the mold to facilitate introduction of the molten glass charge into the latter. The pressing plunger is adapted to press form a portion of the charge in proper angular relation with the mold and is normally non-rotatable during its pressing action. However, the plunger may be permitted to freely rotate immediately following the pressing operation and prior to its full retraction upwardly from the centrifugal mold to function further in charge distribution for centrifugal casting of the remaining portion of the charge.

Accordingly, it is an object of the present invention to provide improved method and apparatus for forming a hollow article of thermoplastic material having a non-circular outline at areas of both maximal and minimal dimensions by combined pressing and centrifugal casting of a charge of thermoplastic material and to overcome various difficulties encountered with conventional forming equipment and procedures.

Another object of this invention is to provide improved apparatus for forming a generally conical-shaped hollow glass article by combinedly press-forming from a glass charge a localized sidewall portion of the article having a prescribed cross-sectional contour over at least the inner surfaces at its small end and distributing a still-moldable portion of the glass charge into a properly-oriented distribution pattern to facilitate the formation of flaring major sidewall portions of the article by centrifugal casting.

Another object of the present invention is to provide a novel press-forming plunger for forming a hollow body member of a cathode-ray picture tube envelope which member has non-circular prescribed areas at both its large and small ends for improved electron scanning of the screen or target area of the completed tube.

Another object of the present invention is to provide an improved press-forming plunger having cylindrical and frusto-conical surfaces at its lower extremity for forming the body component of a television picture tube envelope which component has a nearly rectangular configuration at its large end and non-circular rectangularly oriented configuration over at least the inner surface of its small end.

A further object of this invention is to provide an improved method of press-forming and centrifugally casting a hollow glass article having a rectangular cross-sectional contour at its large open-end by initially press-forming a charge of molten glass into non-flowable rigid and flowable non-rigid portions, the former being formed into final contour while venting the working surfaces of the press plunger and the latter being properly distributed into temporary form by the plunger for centrifugal casting thereof to form extensive outwardly-flaring sidewalls of the article.

A still further object of the present invention is to provide a unique method of forming a frusto-pyramidal shaped hollow glass article from a molten glass charge by pressing its vortex end into essentially rigid condition while simultaneously venting its internal surface to achieve formation of precisely-dimensioned defect-free sidewalls thereat and concomitantly distributing a remaining flowable portion of said glass charge into a rectangular pattern for centrifugal casting of this portion into outwardly-flaring major sidewalls of the hollow glass article which terminate in an open edge having a basically rectangular cross-sectional configuration.

The specific nature of this invention, as well as other objects and advantages will become apparent to those skilled in the art from the following detailed description taken in conjunction with the annexed sheets of drawings on which, by way of preferred example only, are illustrated the preferred embodiments of this invention.

In the accompanying drawings:

FIG. 1 is a side elevational view of apparatus for forming a hollow glass article in accordance with the present invention, the apparatus being illustrated in mold charging arrangement;

FIG. 2 is a fragmentary enlarged view of a portion of FIG. 1, showing the apparatus in pressing relation;

FIG. 3 is a further enlarged vertical sectional view of a mold and press plunger in accordance with the invention during the pressing step;

FIG. 4 is a perspective view of the press-forming and distributing plunger shown in FIGS. 1, 2 and 3;

FIG. 5 is a further enlarged fragmentary vertical sectional view of the bottom apex region of the mold and the press-forming surfaces of the plunger during the pressing step;

FIG. 6 is a bottom view of the plunger showing its press-forming surfaces only in accordance with the invention;

FIG. 7 is a side elevational view of the plunger showing a modified form of venting its press-forming surfaces; and FIG. 8 is a view similar to FIG. 6 further illustrating the plunger venting means shown in FIG. 7.

While this invention will be described hereinafter as specifically applicable to forming hollow glass articles such as funnel members of cathode-ray picture tube envelopes, it will be readily apparent to those skilled in the art that it is equally applicable to forming many other types of hollow articles having frusto-conical, modified frusto-conical or frusto-pyramidal configurations. Also it is to be understood that the phraseology or terminology employed herein is for the purpose of description and not of limitation.

In FIG. 1 reference numeral 10 refers generally to the apparatus of the present invention including an upper forehearth feeder orifice 12 represented schematically through which gobs 13 of molten glass are delivered downwardly into open-topped molds 14 positioned therebeneath.

A plurality of such molds 14 each mounted on an individual pedestal 15 is positioned at equi-spaced operating stations located on a rotating mold table 16. The various stations of the work table are provided to perform sequentially various operations on an article formed within each mold 14. Such operatons include, for example, initial mold charging and press-forming of the glass charge, centrifugal casting of the partially formed glass charge, scoring and cooling operations, and the like. In view of the present invention being concerned only with the forming operation, only one such station on the mold table designated by the letter "F" will be described in detail.

Mold table 16 is preferably rotated in a clockwise direction around a center supporting post by suitable rotatable drive mechanism as known in the art. Each of the individual molds 14 is rotatable about its vertical axis by suitable fluid-pressure drive mechanisms such as a hydraulic motor mounted below the table at station "F."

Basically, the apparatus of the present invention is more or less diagrammatically illustrated in FIGS. 1 and 2, wherein a pressing plunger indicated generally by the numeral 20 is carried by a horizontal beam 21 for lateral and vertical displacement relative to mold 14 positioned beneath gob feeder 12. As shown in FIG. 1, pressing plunger 20 is laterally positioned to one side of the vertical path of delivery of a gob 13 during its gravity transfer through hollow beam 21 from feeder 12 to mold 14. Pressing plunger 20 which is mounted on a carriage 22 is then moved laterally left-to-right as shown in FIG. 1 by an air cylinder motor 23 into alignment with the vertical rotational axis of mold 14. Transverse movement of pressing plunger 20 is guided by a suitable track 24 mounted at the lower edge of hollow beam 21. Press plunger 20 is then moved downwardly by downward movement of beam 21 to press-form a center portion only of gob 13 intermediate of pressing plunger 20 and the interior wall surfaces of mold 14 at its apex area. Beam 21 is lowered by simultaneous action of a pair of air cylinder motors 25 affixed interiorly of upright stationary vertical columns 26 which guide the beam ends. Further details of apparatus for moving press plunger 20 horizontally and vertically into pressing relation with mold 14 are set forth in the referred-to patent application, Serial No. 58,562. The press plunger, supporting beam and mold are shown in pressing relation in FIG. 2.

As shown in FIG. 3, mold 14 is formed with a hollow body 17 and short tubular stem or extension 18, which is mounted on a vertical rotary shaft 19 for rotation therewith about its vertical axis. The mold in actual practice is commonly rotated by a hydraulically rotated motor drive clutch mechanism (not shown). The lower end of the mold cavity has an ejector device 36 mounted therein which comprises a push rod having an enlarged upper end which is vertically reciprocable within mold extension 18.

Pressing and distributing plunger 20 is mounted adjacent to mold 14 for movement into and out of the open mold cavity as described above. Tool or plunger 20 is mounted on a rigid vertical shaft 27 which is in turn supported in rotatable or non-rotatable arrangement by a suitable housing 28 firmly retained by carriage 22. As shown in FIGS. 3, 4 and 5, pressing plunger 20 comprises a short cylindrical section 30 at its lower extremity integral with and extending upwardly into a generally frusto-conical section 31 generally similar to the shape of the mold bottom apex region. Frusto-conical surfaces 31 have either a truly circular cross-sectional configuration or, alternately, a basically circular contour with a series of spaced-apart radially and peripherally projecting protuberances or lugs 32 extending exteriorly from the lower region of the frusto-conical surfaces. Such protuberances or lugs 32 are utilized to shape the central upper surfaces of the glass charge 13a during pressing with an upwardly-facing peripherally-spaced rectangular pattern of radial grooves or depressions. Plunger 20 has essentially modified frusto-pyramidal surfaces 33 above and interconnecting with frusto-conical surfaces 31 adapted to serve a charge distributing function when in engagement with an upper portion of the charge during pressing. The lower edge of frusto-pyramidal surfaces 33 blend smoothly into the upper edge of frusto-conical surfaces 31 and flare upwardly and outwardly therefrom.

Frusto-pyramidal surfaces 33 of the plunger comprise a distributing skirt for forming a flowable still-workable upper portion of the glass charge into a rectangular pattern of concentrated masses concurrently with press-forming of the charge lower portion into rigid non-flowable condition. The distributing skirt has a spaced-apart generally rectangular pattern of concave recesses 34 centrally disposed within its substantially flattened sides facing respective aligned sides of the upper rectangular end of mold 14. Briefly, both the press-forming cylindrical and frusto-conical portions of the plunger utilized to press the apex area of the article as well as the distributing skirt portion thereof are preferably hollow to facilitate control of surface temperatures and to minimize chilling of the distributed portion of the glass charge for its further working.

The large open end of body mold 17 is generally rectangular in shape having a ledge portion 17a which is surrounded by upwardly projecting corner ears or flanges 37. Ledge 17a of the body mold and flanges 37 conjunctively serve to restrain the uppermost portion of the glass during centrifugal spinning to form an integral moil and prevent accidental discharge of any of the glass charge from the mold during rotation.

As disclosed in the referred-to patent applications identified supra, a suitable locking device (not shown) is employed to index mold 14 into proper angular orientation with press plunger 20. The plunger is then brought into cooperative alignment with the mold with the diagonals of both the mold cavity and the frusto-pyramidal distributing skirt portion of the plunger in essentially vertical alignment as outlined hereinabove.

On press-forming a central portion of a molten glass charge in a lower region of a hollow generally frusto-conical shaped mold, it is sometimes possible for pockets of air to become trapped between the molten glass to be shaped and the forming surfaces of the plunger. Such condition permits the glass either to be prevented from filling the space intermediate of the juxtaposed plunger and mold forming surfaces or the creation of lap marks thereat both of which are objectionable in making a high-quality article of glassware. Such conditions can occur particularly at the area of interconnection of frusto-conical and cylindrical surfaces of the plunger and, more specifically, on a plunger having a rectangular pattern of radially and exteriorly projecting protuberances.

At least one opening 40 is provided in the frusto-conical surfaces of the plunger to provide venting thereof. As shown in FIGS. 3 to 6 inclusive, in a plunger having such protuberances preferably a pair of small openings 40 in the form of small apertures extend through the plunger sidewalls between each adjacent pair of protuberances 32. Openings 40 permit the glass on press-forming to penetrate into each opening an extremely short distance before solidifying to expel the trapped air and permit the glass to fill a sector-shaped region between adjacent lugs 32. The openings have similar diameters of the order of a few thousandths inch so that the glass surface contour thereat is marked only by slightly raised elevation nearly imperceptible in the final product.

In an alternate arrangement as shown in FIG. 7 frusto-conical surfaces 31 have a pair of shallow longitudinally and radially projecting grooves 41 therein to facilitate venting the area intermediate the cylindrical and frusto-conical surfaces of the plunger. The grooves effect the formation of slightly raised lineal areas in the interior surfaces of the glass article which have a height of a few thousandths inch. The lineal elevations or raised lines are of such small magnitude that the interior surface contours are not adversely effected. The plurality of grooves 41 in frusto-conical plunger surfaces 31 are shown in plan in FIG. 8.

Either the plurality of openings 40 or the series of radially projecting grooves 41 is utilizable at the small end of frusto-conical surfaces 31 to permit forming the glass thereat with precisely-dimensioned sidewall thicknesses which are free of imperfections. The surface or sidewall characteristics of the product are not deterimentally affected by the venting openings provided in the plunger press-forming surfaces.

Summarizing the present method, molten glass charge 13 is disposed in hollow mold 14 at its bottom apex region while the mold is stationary or rotating at a very slow rate (FIG. 1). Within the brief interval of time during which the charge is permitted to settle into the mold apex region, press plunger 20 and mold 14 are moved into proper axial and angular alignment. This is accomplished by charging the mold as described hereinabove and then laterally moving the tool over the mold into axial and coangular alignment therewith.

Plunger 20 is moved downwardly by the pair of air cylinder motors 25 which lower beam 21 to press-form a localized central region of the charge into either circular or non-circular configuration as desired. Cylindrical portion 30 of the plunger penetrates the mold bottom apex area defined by cylindrical extension 18 of the mold. The mold surfaces of the apex area are preferably circular and cylindrical or generally rectangular in horizontal cross-section. Thus, a lowermost central portion of the charge in the mold bottom is press-formed into essentially rigid condition with at least the upwardly-facing surfaces formed by the plunger preferably having a non-circular configuration. However, the invention is equally applicable to press-forming the article interior surface portion with a circular cross-sectional contour.

Simultaneously with forming the upwardly-facing central portion of the charge, the plunger areas intermediate its cylindrical and frusto-conical forming surfaces are vented by either a plurality of sidewall openings or a plurality of outwardly and radially extending grooves. Concurrently with the aforesaid venting of the prescribed areas, the remaining upper portion of the molten glass charge is distributed into a rectangular pattern of non-rigid still-flowable concentrated masses disposed immediately above the pressed portion. This is accomplished by the spaced-apart concave recesses in the distributing skirt portion of the plunger facing the flattened upper edges of the mold top end.

The plunger is then at least partially withdrawn from contact with the rigidly pressed portion of the charge and the mold is then rapidly rotated about its vertical axis thereby spreading and molding the distributed flowable charge over the extensive major surfaces of the mold by centrifugal force. Rotation of the mold is continued until all portions of the charge are essentially rigid, following which rotation of the mold is discontinued and the mold stopped. The newly-formed article is then conducted to other various operations such as scoring of its moil portion and cooling of the article prior to its removal from the mold. This is effected by raising the article upwardly a short distance with ejector device 36 and removing the article from the mold.

Various modifications may be resorted to within the spirit and scope of the appended claims.

I claim:
1. In a plunger for press forming at least a central interior portion of a generally frusto-pyramidal shaped hollow glass article, said plunger including upper and lower integral portions, the lower portion of said plunger having downwardly-projecting cylindrical surfaces at its lower extremity and interconnecting substantially frusto-pyramidal surfaces adjacent thereto, said surfaces being capable of forming the central interior surfaces of said glass article at its apex area into complemental contour, the improvements of a plurality of vent openings disposed adjacent the interconnecting area of said cylindrical and and substantially frusto-pyramidal surfaces extending exteriorly of the lower portion of said plunger.

2. A plunger in accordance with claim 1 wherein the said plunger is hollow and said plurality of openings comprise small apertures extending through the sidewalls of said plunger.

3. A plunger in accordance with claim 1 wherein said plurality of openings comprise shallow grooves extending radially in spaced relation over said frusto-pyramidal surfaces.

4. In a method of making a hollow glass article, such as a cathode ray tube envelope, in a mold having a tubular lower end joined through an apex portion to an upwardly flaring side wall portion, the method including depositing a gob of molten glass at said mold apex portion and inserting a pressing element into contact with the gob to press-form a corresponding article apex portion, the pressing element having a lower portion insertable into said mold tubular end and an upper portion substantially parallel to said mold side wall portion, the improvement of venting to the atmosphere by means of the plunger any air entrapped between said gob and said pressing element in the region of juncture of said element lower portion and said element upper portion.

5. In a method as defined in claim 4, the further improvement wherein said pressing element has its interior exposed to atmospheric pressure and said entrapped air is vented to the element interior.

6. In a method as defined in claim 4, the further improvement of venting entrapped air at a plurality of circumferential locations exteriorly of said pressing elements to the atmosphere above the area of gob-element contact.

References Cited in the file of this patent

UNITED STATES PATENTS

| | | |
|---|---|---|
| 461,489 | Ripley | Oct. 20, 1891 |
| 2,238,198 | Weber | Apr. 15, 1941 |
| 2,591,521 | De Gier | Apr. 1, 1952 |
| 2,662,346 | Giffen | Dec. 15, 1953 |
| 2,696,699 | Giffen | Dec. 14, 1954 |
| 2,853,834 | Vincent | Sept. 30, 1958 |
| 2,861,393 | Ruff | Nov. 25, 1958 |
| 2,969,613 | Lambert et al. | Jan. 31, 1961 |

FOREIGN PATENTS

| | | |
|---|---|---|
| 806,761 | Great Britain | Dec. 31, 1958 |